(12) United States Patent
Cooley et al.

(10) Patent No.: US 7,549,830 B2
(45) Date of Patent: Jun. 23, 2009

(54) SERVICEABLE W-BASE FASTENER

(75) Inventors: Brock T. Cooley, Bloomer, WI (US); Wayne M. Hansen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 387 days.

(21) Appl. No.: 11/301,451

(22) Filed: Dec. 13, 2005

(65) Prior Publication Data

US 2006/0231690 A1 Oct. 19, 2006

Related U.S. Application Data

(60) Provisional application No. 60/671,959, filed on Apr. 15, 2005.

(51) Int. Cl.
*F16B 19/00* (2006.01)
(52) U.S. Cl. .......................................... 411/508; 24/297
(58) Field of Classification Search ............. 411/38–41, 411/913, 508, 509; 24/297
See application file for complete search history.

(56) References Cited

U.S. PATENT DOCUMENTS

| | | | |
|---|---|---|---|
| 4,122,583 A * | 10/1978 | Grittner et al. ............. | 24/703.1 |
| 4,318,650 A * | 3/1982 | LLauge ....................... | 411/38 |
| 4,629,356 A | 12/1986 | Hayashi | |
| 4,728,068 A | 3/1988 | Rivkin | |
| 4,920,618 A * | 5/1990 | Iguchi ......................... | 24/453 |
| 5,425,609 A * | 6/1995 | Smith ......................... | 411/344 |
| 5,509,182 A * | 4/1996 | Nakanishi .................... | 24/297 |
| D382,466 S | 8/1997 | Hirose | |
| 5,689,863 A * | 11/1997 | Sinozaki ...................... | 24/297 |
| 5,797,714 A | 8/1998 | Oddenino | |
| 5,851,097 A | 12/1998 | Shereyk et al. | |
| 6,449,814 B1 | 9/2002 | Dinsmore et al. | |

FOREIGN PATENT DOCUMENTS

JP 2002106519 4/2002

\* cited by examiner

*Primary Examiner*—Gary Estremsky
(74) *Attorney, Agent, or Firm*—Mark W. Croll; Paul F. Donovan

(57) ABSTRACT

A w-base fastener that may be used in many applications, including numerous applications throughout the automotive industry, combines the functionality of a w-base fastener with the serviceability of other fasteners. The w-base fastener of the invention provides the ability to service the w-base fastener without damaging the panel or hole in which the fastener is inserted. This is accomplished by incorporating a secondary connection into the w-base fastener. This secondary connection permits the fastener to be easily extracted by providing a technique for pulling the legs of the w-base fastener inward prior to extraction of the fastener from the hole.

19 Claims, 4 Drawing Sheets

SERVICEABLE W-BASE FASTENER

CROSS REFERENCE TO RELATED APPLICATIONS

This Non-Provisional Application claims benefit to U.S. Provisional Application Ser. No. 60/671,959 filed Apr. 15, 2005.

FIELD OF THE INVENTION

The present invention relates generally to fasteners, and more particularly, to w-base fasteners.

BACKGROUND OF THE INVENTION

It is known that fasteners are used in various applications to perform various functions. It is further known that numerous types of fasteners are used in various automotive applications. A common fastener that is widely used throughout a vehicle is known as a w-base clip or w-prong fastener (hereinafter "w-base fastener"). The w-base fastener type and its fastening scheme provide a simple yet effective solution to many fastening needs. As a result, this fastener is economical, functional, and widely accepted among the automotive industry. Exemplary w-base fasteners are disclosed in U.S. Pat. Nos. 5,851,097 and 5,797,714, both assigned to Illinois Tool Works, Inc.

Regardless of size or complexity, the w-base fastener utilizes some basic principles in fastening. These principles include multiple legs that compress towards a common member, of which the legs are attached, during the installation in a hole. These legs then engage the backside of the hole to which the fastener is mounted to hold the fastener in a mounted position within the hole. The fastener also includes a head or similar structure that permits items to be mounted to the fastener. The w-base fastener provides an excellent method of retention with an outstanding insertion to extraction ratio.

A known drawback exists, however, when servicing or replacing the known w-base fastener. This problem occurs when the backside of the hole in which the fastener is inserted is not accessible for disengagement of the legs. In this situation, which is a common occurrence in a vehicle, the hole may be damaged upon extraction of the w-base fastener, rendering the hole useless. The invention overcomes this problem by providing a means of securing the w-base fastener to the hole with the option of servicing or replacing the fastener should the need arise without damaging the hole when the fastener is extracted.

SUMMARY OF THE INVENTION

The present invention is directed to a w-base fastener that may be used in many applications, including numerous applications throughout the automotive industry. The invention provides a fastener that combines the functionality of a w-base fastener with the serviceability of other fasteners. Indeed, the invention provides the ability to service the w-base fastener without damaging the panel or hole in which the fastener is inserted.

The invention achieves this desired serviceability by providing a w-base fastener that incorporates a secondary connection. This secondary connection can be one of multiple embodiments that achieve this serviceability objective. Upon insertion, the w-base fastener of the invention functions in a manner similar to known w-base fastener designs. That is, the legs flex inward toward a common member by pressure exerted on the legs by the edge of the hole. After completely passing through the hole, the legs flex outward creating an interference fit between the backside of the hole and the legs, thereby securing the fastener to the hole. The secondary connection permits the fastener to be easily extracted by providing a technique for pulling the legs inward prior to extraction of the fastener from the hole so that the fastener can pass freely through the hole without causing damage to the hole.

Other features and advantages of the invention will become apparent to those skilled in the art upon review of the following detailed description, claims and drawings in which like numerals are used to designate like features.

Figure 1:
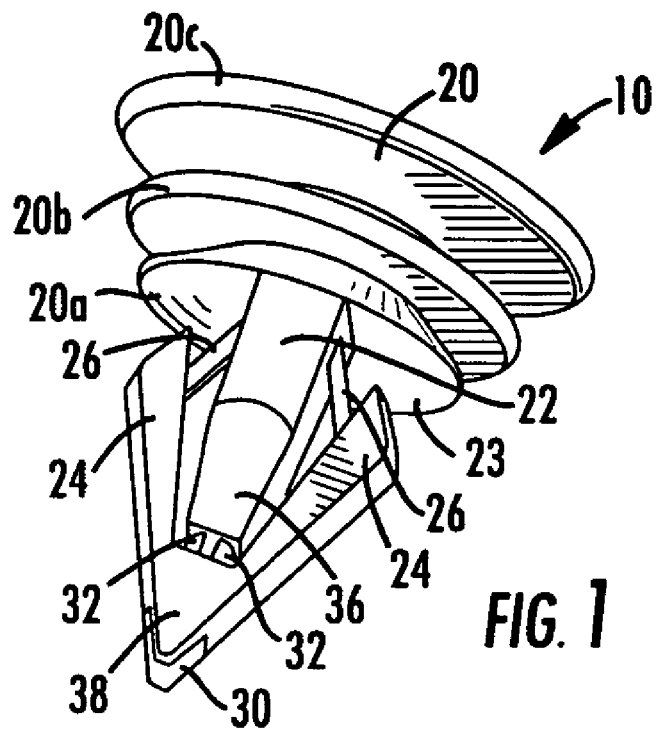
FIG. 1 is an isometric view of an exemplary embodiment of a w-base fastener of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

The present invention may be embodied in many forms. In one exemplary embodiment depicted in FIG. 1, the present invention is directed to a w-base fastener or clip 10 that, as discussed below, provides the ability to service the w-base fastener without damaging the panel or hole in which the fastener is inserted. Additionally, the invention provides the functionality of traditional w-base fasteners with the serviceability of other fasteners.

As shown in FIGS. 1 and 3-5, the w-base fastener 10, which may be made of plastic or any other suitable material, includes a head 20, a body 22, and a plurality of legs 24 that are joined to the body 22 by a plurality of tethers 26. The head 20 is used to prevent the fastener 10 from completely passing through the panel or hole in which the fastener is mounted. The head 20 may define numerous shapes and configurations, including the depicted multi disk-shaped configuration. The head 20 may define a first, second and third disc-shaped head portion 20a, 20b and 20c, respectively. As further illustrated in FIG. 2, the first head portion 20a may define a disc-shape angularly extending contact surface 23 that, in use, serves to prevent the fastener 10 from completely passing through the panel or hole in which the fastener 10 is mounted. This is accomplished by the configuration of the head portion 20a, which defines a diameter that is greater than the diameter of the hole in which the fastener is mounted. As mounted to a panel, the angular configuration of the head portion 20a may provide a resiliency, similar to a spring washer, to further secure the fastener 10 to the panel.

The second head portion 20b and third head portion 20c may serve as mounting members to permit other structures or items to be mounted to the fastener 10 vis-à-vis the second and third head portions. The second head portion 20b and third head portion 20c may be disc-shaped or define other shapes and may be joined together by, and spaced apart from each other by an intermediate portion 21. The intermediate portion 21 defines a diameter that is less than the diameters of the second head portion 20b and third head portion 20c and a height that permits adequate spacing between the second head portion 20b and third head portion 20c. As can be appreciated, with the depicted configuration, items or other structures may be mounted to the intermediate portion 21 between the second and third head portions. One of skill in the art will appreciate that the head 20 may define numerous other known head configurations that permit the mounting of other structures to the fastener 10 and that prevent the fastener from being pulled through the hole or panel to which it is mounted. Consequently, the illustrated head 20 is merely an example of one of the many possible configurations.

Connected to or formed integral with the head 20 is the body 22 or common member. The body 22 may extend outwardly from the head portion 20a and define an elongated member that provides the structure on which the plurality of tethers 26 may be attached. The body 22 may define a cylindrical or rectangular configuration or any other possible configuration. In the exemplary embodiment, the plurality of tethers 26 may be attached to the body 22. Alternatively, the plurality of tethers 26 may be attached to the head 20. In the illustrated embodiment, the body 22 defines opposing tapered portions 36 that enhance the insertion of the fastener 10 into the panel or hole in which the fastener 10 is mounted. The body 22 further defines retaining tabs 32 formed at the end of the body 22. The retaining tabs 32 may be two opposing flexible members that are configured to flex toward each other and snap-fit within the hole 30 (FIG. 2) formed at the common end 38 of the legs 24 to provide a releasable connection between the body 22 and the hole 30. As further described below, the releasable fit between the retaining tabs 32 and the hole 30 and consequently the permissible movement of the body 22 relative to the common end 38 of the legs 24 provide the secondary connection that facilitates the removal of the fastener 10 from the hole in the panel without damaging the hole.

The tethers 26 extend outwardly from the body 22 to provide a connection between the body 22 and the legs 24. As depicted, one tether 26 extends between the body 22 and each leg 24. However, one or more tethers may be used to connect each leg 24 to the body 22. The tether 26 is joined near the end of the leg 24 and, in use, serves to pull the leg 24 inward and toward the body 22 upon movement of the body 22 relative to the common end 38 of the legs 24. The tether 26 may define numerous configurations that serve to connect the body 22 to each leg 24 and provide a technique for drawing or pulling each leg 24 toward the body 22.

Figure 2:
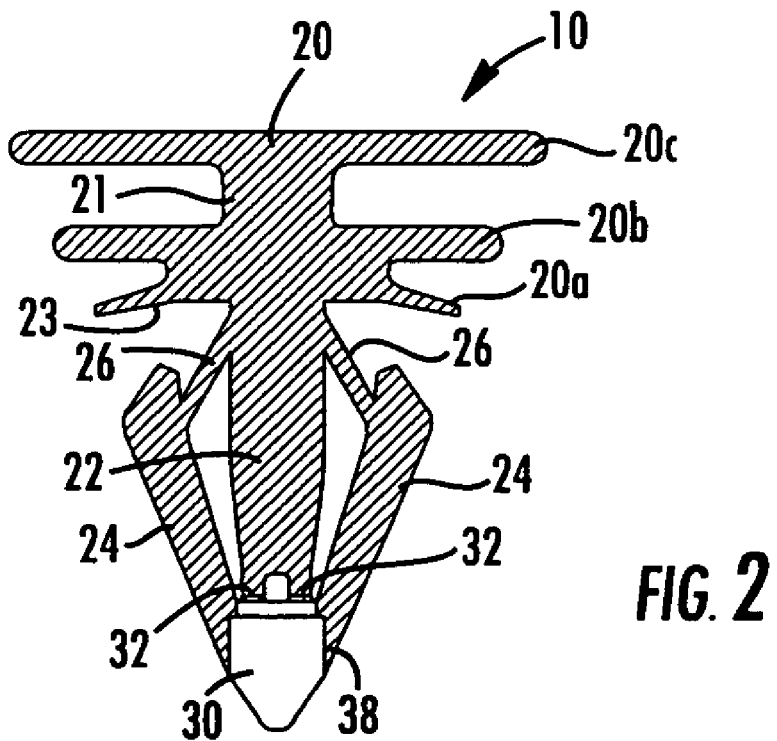
FIG. 2 is a cross-section view of the w-base fastener of FIG. 1.
Figure 3:
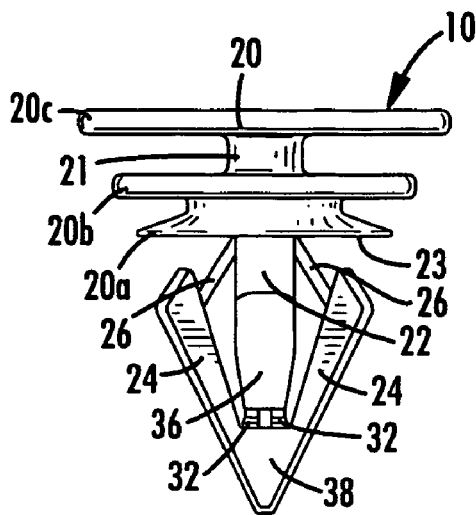
FIG. 3 is a side view of the w-base fastener of FIG. 1.
Figure 4:
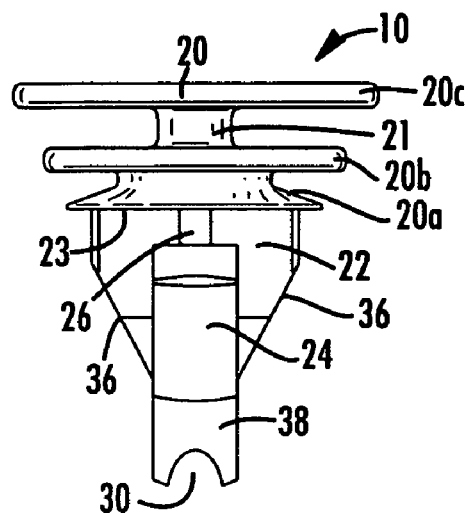
FIG. 4 is another side view of the w-base fastener of FIG. 1.
Figure 5:
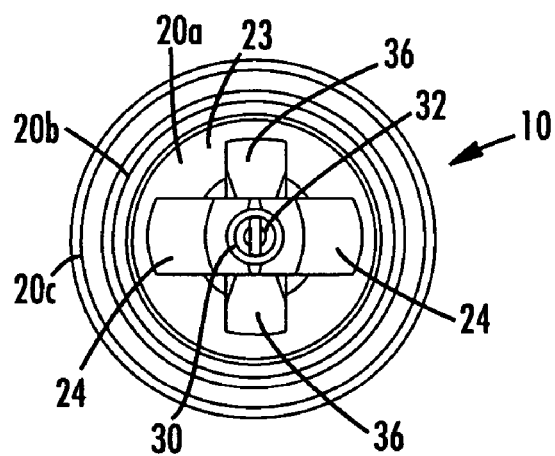
FIG. 5 is a bottom view of the w-base fastener of FIG. 1.

The legs 24 are joined at the common end 38 which forms or defines a point or tip that is configured to facilitate the insertion of the fastener 10 into the panel or hole to which the fastener is mounted. As shown in FIG. 2, the end 38 defines the hole 30 that is configured to allow the retaining tabs 32 to snap-fit the body 22 to the end 38. This interaction between the hole 30 and retaining tabs 32 is what permits the serviceability or removal of the fastener 10 from the panel or hole to which the fastener is mounted, without damaging the panel or hole. More specifically, the retaining tabs 32 releasably engage the hole 30. In the fully engaged position where the retaining tabs 32 are fully inserted into the hole 30, the tethers 26 cause the legs 24 to extend outwardly or away from the body 22. In a disengaged position, that is when the retaining tabs 32 are pulled out of the hole 30, the tethers 26 cause the legs 24 to be drawn inwardly or toward the body 22. It is in this disengaged position, that is, when the legs are drawn inward toward the body 22, that the fastener 10 may be removed from the panel or hole in which the fastener is inserted and mounted. It should be understood that the force required to pull the retaining tabs 32 out of the hole 30, that is, from the engaged position to the disengaged position, is less than the extraction force required to pull the mounted fastener 10 from the panel or hole in which it is mounted.

By way of further illustration, the releasable connection between the hole 30 and retaining tabs 32 will provide a desired level of retention force but not enough retention to cause damage to the panel or other material to which the fastener is mounted. For example, a hole in a 0.8 inch thick sheet of metal might deform if 100 pounds of extraction force is applied. If a specific application requires 50 pounds of retention force, but the w-base fastener requires 120 pounds of force before it will extract from the hole, the hole in the panel will become damaged if the 120 pounds of force is exerted on the fastener to remove it from the hole. The invention alleviates this problem by providing a connection between the retaining tabs 32 and the hole 30 such that the retaining tabs 32 will release from the hole 30 between the required 50 pounds and the maximum 100 pounds. Once this release occurs, the movement of the body 22 will pull the tethers 26 which, in turn, pull the legs 24 toward the body 22 since the legs 24 are connected to the tethers 26, thus disengaging the legs from the backside of the panel on which the fastener is mounted. Once in this position, the body 22 and legs 24 will freely pass out of the hole. The fastener 10 can then be reset and reused in the same application, if desired.

Figure 6:
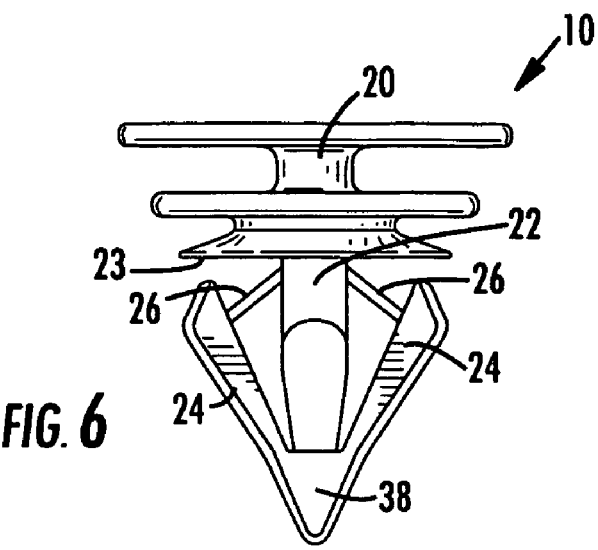
FIG. 6 is a side view of the w-base fastener of FIG. 1 in the ready-to-use, pre-driven state.
Figure 7:
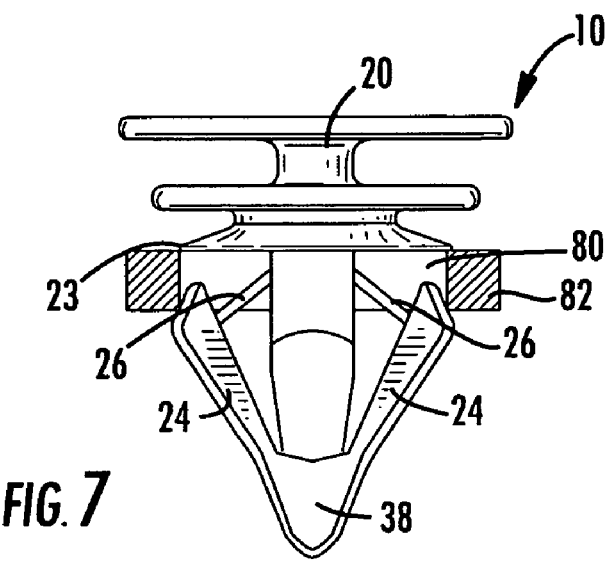
FIG. 7 is a side view of the w-base fastener of FIG. 1 as installed through an exemplary hole in a panel.
Figure 8:
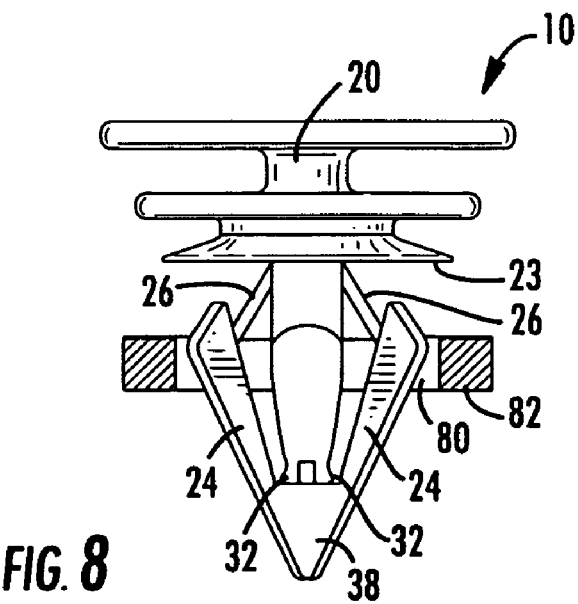
FIG. 8 is a side view of the w-base fastener of FIG. 1 during extraction from an exemplary hole in a panel.

The principles of the invention are further illustrated by FIGS. 6-8. Referring to FIG. 6, the fastener 10 is depicted in a "pre-driven" state, that is, the retaining tabs 32 have been inserted into the hole 30. In this state, the legs 24 are in a position away from the body 22.

Turning to FIG. 7, when the fastener 10 is inserted into a hole 80 formed in a panel 82, the fastener 10 behaves similar to known w-base fasteners. That is, the legs 24 flex inward by pressure exerted on the legs by the edge of the hole 80. After completely passing through the hole, the legs 24 flex outward creating an interference between the backside of the panel 82 and the legs 24. The head portion 20a will contact the front side of the panel 82 and the combination of the legs 24 contacting the backside of the panel 82 and the head portion 20a contacting the front side of the panel 82 secures the fastener to the panel 82.

Referring to FIG. 8, to extract the fastener 10 from the hole, the head 20 is pulled away from the panel 82 causing the retaining tabs 32 to release from the hole 30. This will translate the body 22 which, in turn, causes the tethers 26 to pull the legs 24 inward toward the body 22 until the legs are clear of the edge of the hole, allowing the fastener 10 to be removed from the hole without damaging the hole 80 or the panel 82.

Figure 9:
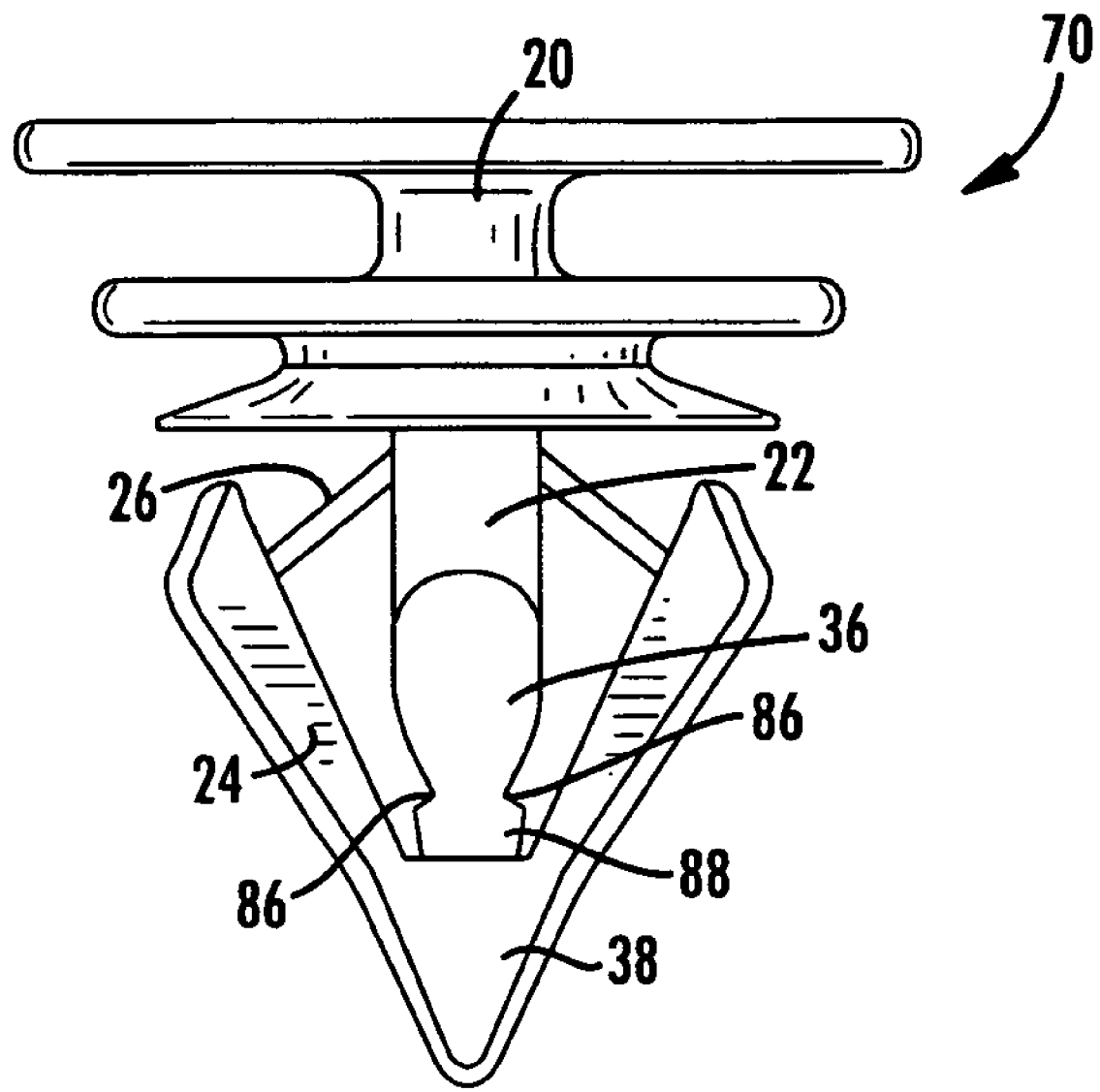
FIG. 9 is an alternative embodiment of a w-base fastener of the invention.

Referring to FIG. 9, an alternative embodiment includes a fastener 70 that is molded as a single rigid unit with a releasable member that may include two V-shaped notches 86 in the body 22 positioned at the end of the tapered portion 36. These notches 86 create a break joint at this location. When the fastener 70 is extracted, the body 22 will break at these "V" notches. Once broken, the body 22 will separate from end piece 88 and will pull on the legs 24 vis-à-vis the tethers 26 to permit the fastener to be removed from the hole or panel on which it is mounted, without causing damage to the hole or panel. Once the fastener 70 is removed, however, the fastener may not be reusable because of the break in the body 22 at the notches 86. A benefit of this embodiment though is that this fastener can be designed with a higher extraction force than the above embodiment, for those applications where it is desired for the fastener to have such a higher extraction force. The remaining features of the fastener 70 are similar or identical to the embodiments described above.

It should be understood that the secondary connection of the invention is not limited to the hole and retaining tab configuration or the use of a break joint. Other embodiments and configurations are possible to provide the secondary connection or similar releasable connection and are considered within the scope of the invention.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A w-base fastener comprising:
   a fastener body defining a first end and a second end, the first end including a retainer,
   a head formed with the second end of the fastener body,
   a plurality of legs joined at a common end which defines a pointed tip configured to facilitate insertion of the fastener into a mating hole, the common end forming a hole for receiving the retainer, each leg including a distal end spaced away from the common end, each distal end being configured and adapted to be completely received within the mating hole; and
   a plurality of tethers, each tether having a first end and a second end, the first ends connected to the plurality of legs near the distal ends and the second ends connected to the fastener body, wherein the second ends of the tethers are positioned closer to the head than the distal ends of the legs,
   whereby movement of the fastener body in one direction causes the tethers to move the plurality of legs outward with respect to the fastener body, and whereby movement of the fastener body in an opposite direction caused the tethers to move the plurality of legs inward with respect to the fastener body.

2. The w-base fastener of claim 1 wherein the fastener body defines at least one inclined surface.

3. The w-base fastener of claim 1 wherein the retainer snap-fits into the hole.

4. The w-base fastener of claim 1 wherein the head defines multiple head portions.

5. The w-base fastener of claim 4 wherein one of the multiple head portions defines a contact surface.

6. A w-base fastener comprising:
   a fastener body defining a first end and a second end, the first end including a retainer,
   a head formed with the second end of the fastener body,
   a plurality of legs joined at a common end which defines a pointed tip configured to facilitate insertion of the fastener into a mating hole, the common end forming a hole for receiving the retainer, each leg including a distal end spaced away from the common end, each distal end being configured and adapted to be completely received within the mating hole; and
   a plurality of tethers connected to the plurality of legs near the distal ends and to the fastener body, wherein ends of the tethers connected to the fastener body are closer to the head than the distal ends of the legs,
   whereby movement of the retainer into the hole causes the plurality of legs to move away from the fastener body and movement of the retainer out of the hole causes the legs to move toward the fastener body.

7. The w-base fastener of claim 6 wherein the movement of the fastener body causes movement of the plurality of legs.

8. The w-base fastener of claim 6 wherein the fastener body defines at least one inclined surface.

9. The w-base fastener of claim 6 wherein the retainer snap-fits into the hole.

10. The w-base fastener of claim 6 wherein the head defines multiple head portions.

11. The w-base fastener of claim 6 wherein one of the multiple head portions defines a contact surface.

12. A fastener comprising:
    a fastener body defining a first end and a second end, the first end including a releasable member,
    a head formed with the second end of the fastener body,
    a plurality of legs joined at a common end which defines a pointed tip configured to facilitate insertion of the fastener into a mating hole, the releasable member connected to the common end, each leg including a distal end spaced away from the common end, each distal end being configured and adapted to be completely received within the mating hole; and
    a plurality of tethers connected to the plurality of legs near the distal ends and to the fastener body, wherein ends of the tethers connected to the fastener body are closer to the head than the distal ends of the legs,
    whereby movement of the fastener body in one direction causes the tethers to move the plurality of legs outward with respect to the fastener body, and whereby movement of the fastener body in an opposite direction caused the tethers to move the plurality of legs inward with respect to the fastener body.

13. The fastener of claim 12 wherein the plurality of legs extend angularly outwardly from the common end.

14. The fastener of claim 12 wherein the fastener body defines at least one inclined surface.

15. The fastener of claim 12 wherein the releasable member is a retainer that snap-fits into a hole in the common end.

16. The fastener of claim 12 wherein the releasable member includes a break joint.

17. The fastener of claim 16 wherein the break joint includes at least one notch.

18. The fastener of claim 12 wherein the head defines multiple head portions.

19. The fastener of claim 12 wherein the common end forms a tip.

* * * * *